US009630647B2

(12) United States Patent
Kikuchi et al.

(10) Patent No.: US 9,630,647 B2
(45) Date of Patent: Apr. 25, 2017

(54) ELECTRIC POWER STEERING SYSTEM

(71) Applicant: JTEKT CORPORATION, Osaka-shi, Osaka (JP)

(72) Inventors: Arata Kikuchi, Soraku-gun (JP); Yoshitomo Nagai, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 242 days.

(21) Appl. No.: 13/946,289

(22) Filed: Jul. 19, 2013

(65) Prior Publication Data

US 2014/0027197 A1 Jan. 30, 2014

(30) Foreign Application Priority Data

Jul. 27, 2012 (JP) ................................ 2012-167188

(51) Int. Cl.
*B62D 5/02* (2006.01)
*B62D 5/04* (2006.01)
*F16H 57/021* (2012.01)
*F16H 55/24* (2006.01)

(52) U.S. Cl.
CPC ......... *B62D 5/0454* (2013.01); *B62D 5/0409* (2013.01); *F16H 55/24* (2013.01); *F16H 2057/0213* (2013.01)

(58) Field of Classification Search
CPC ...... B62D 5/0409; B62D 3/04; B62D 5/0403; B62D 5/0454
USPC ........................................................ 180/444
See application file for complete search history.

(56) References Cited

U.S. PATENT DOCUMENTS

| 6,900,564 B2 * | 5/2005 | Kobayashi et al. ............ 310/83 |
| 2002/0189892 A1 * | 12/2002 | Appleyard ..................... 180/444 |
| 2004/0245040 A1 * | 12/2004 | Eda ....................... B62D 5/0409 180/444 |
| 2005/0224278 A1 | 10/2005 | Segawa |
| 2006/0169528 A1 * | 8/2006 | Yuasa et al. .................. 180/444 |
| 2006/0175124 A1 * | 8/2006 | Saito ........................ B62D 1/16 180/444 |
| 2006/0196721 A1 * | 9/2006 | Saito et al. ................... 180/443 |

(Continued)

FOREIGN PATENT DOCUMENTS

| EP | 2 450 262 A1 | 5/2012 |
| EP | 2 842 835 A1 | 3/2015 |

(Continued)

OTHER PUBLICATIONS

Apr. 21, 2015 Extended Search Report issued in European Patent Application No. 13177761.7.

*Primary Examiner* — Joseph Rocca
*Assistant Examiner* — Conan Duda
(74) *Attorney, Agent, or Firm* — Oliff PLC

(57) ABSTRACT

An electric power steering system includes a joint that connects a rotary shaft of an electric motor with a worm shaft of a speed reducer. The joint includes a first rotational element that has a boss into which a first end portion of the worm shaft is press-fitted, and a flange extending radially from the boss. The first bearing is held by a housing and supports the first end portion so that the first end portion is rotatable and movable in an axial direction. A first elastic body, which urges the worm shaft in the axial direction toward the electric motor through the first rotational element, is provided between an inner ring of the first bearing and the flange.

6 Claims, 5 Drawing Sheets

(56) References Cited

U.S. PATENT DOCUMENTS

| | | | |
|---|---|---|---|
| 2007/0158131 A1* | 7/2007 | Iwasa et al. | 180/444 |
| 2009/0295325 A1* | 12/2009 | Sekine et al. | 318/646 |
| 2010/0078264 A1* | 4/2010 | Kreller | E04G 7/28 182/113 |
| 2010/0239199 A1* | 9/2010 | Nakagawa | 384/283 |
| 2011/0017542 A1* | 1/2011 | Kim et al. | 180/444 |
| 2011/0067946 A1* | 3/2011 | Kim | 180/444 |
| 2011/0120797 A1* | 5/2011 | Kitahata et al. | 180/443 |
| 2012/0048640 A1* | 3/2012 | Hamakita | 180/444 |
| 2012/0061168 A1* | 3/2012 | Hamakita et al. | 180/444 |
| 2012/0111657 A1* | 5/2012 | Hamakita et al. | 180/444 |
| 2012/0125132 A1* | 5/2012 | Bernhard et al. | 74/89.14 |
| 2012/0272765 A1* | 11/2012 | Fuechsel et al. | 74/416 |
| 2012/0322566 A1* | 12/2012 | Kim | 464/88 |
| 2013/0075189 A1* | 3/2013 | Sekikawa et al. | 180/444 |
| 2013/0133974 A1* | 5/2013 | Hamakita et al. | 180/444 |
| 2014/0182401 A1* | 7/2014 | Ishii | B62D 5/0409 74/89.14 |

FOREIGN PATENT DOCUMENTS

| | | |
|---|---|---|
| JP | 2003-002213 A | 1/2003 |
| JP | 2005-170140 A | 6/2005 |
| JP | 2005-289314 A | 10/2005 |
| JP | B2-4442421 | 3/2010 |
| JP | A-2012-101649 | 5/2012 |

* cited by examiner

ELECTRIC POWER STEERING SYSTEM

INCORPORATION BY REFERENCE/RELATED APPLICATION

This application claims priority to Japanese Patent Application No. 2012-167188 filed on Jul. 27, 2012 the disclosure of which, including the specification, drawings and abstract, is incorporated herein by reference in its entirety.

BACKGROUND OF THE INVENTION

1. Field of the Invention

The invention relates to an electric power steering system.

2. Discussion of Background

In an electric power steering system, an output from an electric motor is transmitted to a steered mechanism after speed of the output is reduced through a worm shaft and a worm wheel, and thus, torque assistance for steering operation is provided. Although backlash is needed in engagement between the worm shaft and the worm wheel, rattle may be caused by the backlash while a vehicle is traveling.

Therefore, conventionally, an electric power steering system has been proposed in which backlash is removed by elastically urging a bearing, which supports one end of a worm shaft, toward a worm wheel. Another electric power steering system has been proposed in which paired elastic bodies are arranged on respective sides of an inner ring of a bearing in order to suppress backlash of the bearing (for example, US2005/0224278 A1 and US2012/0111657 A1).

In US2005/0224278 A1, an elastic body is supported between a nut that is screwed and fitted to an outer periphery of the other end of the worm shaft, and an inner ring of the bearing in a state in which the elastic body is compressed in an axial direction. In US2012/0111657 A1, the elastic body is supported between a circular plate, which is fixed by a retaining ring to an outer periphery of the other end of a worm shaft in an axial direction, and the inner ring of the bearing in a state in which the elastic body is compressed in the axial direction. Meanwhile, in addition to the structure that supports the elastic body in the axial direction, there is provided a joint mechanism that connects the other end of the worm shaft with a rotary shaft of an electric motor so that torque is transmittable between the other end of the worm shaft and the rotary shaft. Therefore, a structure is complicated.

SUMMARY OF THE INVENTION

The invention provides an electric power steering system having a simplified structure.

According to a feature of an example of the invention, there is provided an electric power steering system including: an electric motor having a rotary shaft; a speed reducer that includes a worm shaft having a first end portion and a second end portion, and a worm wheel that meshes with the worm shaft; a joint that includes a rotational element that has a boss into which the first end portion of the worm shaft is press-fitted and a flange extending radially from the boss, the joint connecting the first end portion of the worm shaft with the rotary shaft so that torque is transmittable between the first end portion of the worm shaft and the rotary shaft; a housing that houses the speed reducer; a bearing that is held by the housing and supports the first end portion of the worm shaft so that the first end portion of the worm shaft is rotatable and movable in an axial direction; and an elastic body that is provided between an inner ring of the bearing and the flange, and urges the worm shaft in the axial direction toward the electric motor through the rotational element.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
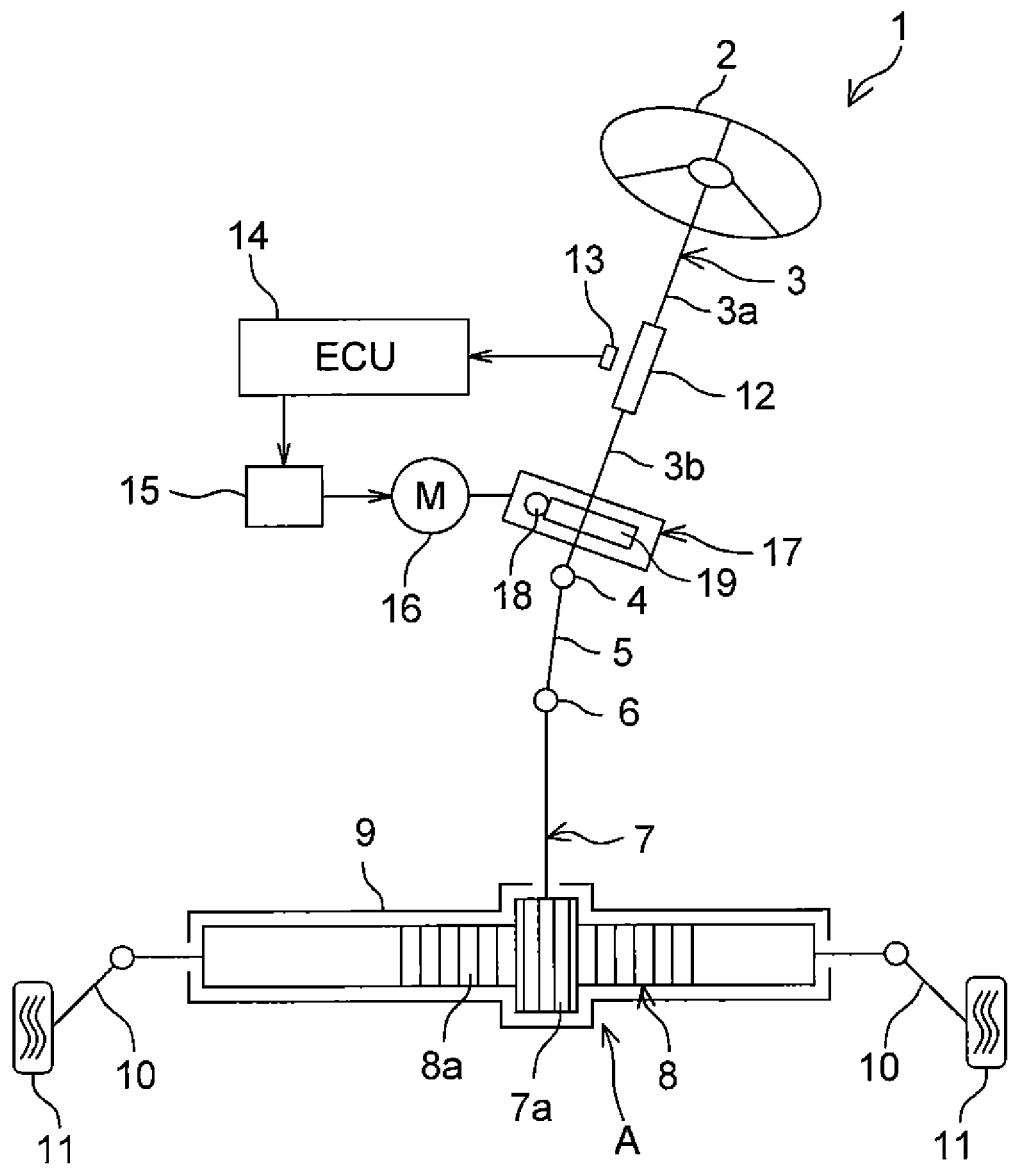
FIG. 1 is a schematic view of an electric power steering system according to an embodiment of the present invention.

FIG. 1 is a schematic structural view of an electric power steering system according to an embodiment of the present invention. An electric power steering system 1 includes a steering shaft 3 having one end to which a steering member 2 such as a steering wheel is connected, an intermediate shaft 5 that is connected to the steering shaft 3 through a universal joint 4, a pinion shaft 7 that is connected to the intermediate shaft 5 through a universal joint 6, and a rack bar 8 that serves as a steered shaft, and that includes a rack 8a that meshes with a pinion 7a provided in the vicinity of an end portion of the pinion shaft 7, the rack bar 8 extending in a right-left direction of a vehicle. The pinion shaft 7 and the rack bar 8A constitute a steered mechanism A that includes a rack-and-pinion mechanism.

The rack bar 8 is supported within a housing 9 through a plurality of bearings (not shown) so that the rack bar 8 is able to be linearly reciprocated. The housing is fixed to a vehicle body. Both end portions of the rack bar 8 project toward respective sides of the housing 9, and tie rods 10 are connected to the respective end portions. The tie rods 10 are connected to corresponding steered wheels 11 through corresponding knuckle arms (not shown). As the steering member 2 is operated and the steering shaft 3 is rotated, the rotation is converted by the pinion 7a and the rack 8a into a linear motion of the rack bar 8 along the right-left direction of the vehicle. Thus, the steered wheels 11 are steered.

The steering shaft 3 includes a first steering shaft portion 3a on an input side that has one end to which the steering member 2 is connected, a second steering shaft portion 3b on an output side that is continuous with the pinion shaft 7, and a torsion bar 12 that connects the first steering shaft portion 3a with the second steering shaft portion 3b so that the first steering shaft portion 3a and the second steering shaft portion 3b are rotatable relative to each other on a common axis. There is provided a torque sensor 13 that detects steering torque based on the amount of relative rotational displacement between the first steering shaft portion 3a and the second steering shaft portion 3b that are connected with one another through the torsion bar 12. Results of torque detection by the torque sensor 13 are provided to an ECU 14.

The ECU 14 drives and controls a steering-assisting electric motor 16 via a drive circuit 15, based on, for example, the results of torque detection and results of vehicle speed detection provided by a vehicle speed sensor (not shown).

Speed of output rotation of the electric motor 16 is reduced through a speed reducer 17 that serves as a transmission device, and then, the rotation whose speed has been reduced is transmitted to the pinion shaft 7, and is converted into a linear motion of the rack bar 8. Thus, steering is assisted. The speed reducer 17 includes a worm shaft 18 that serves as a driving gear and that is driven to rotate by the electric motor 16, and a worm wheel 19 that serves as a driven gear and that meshes with the worm shaft 18 and is connected to the second steering shaft portion 3b of the steering shaft 3 so as to rotate together with the second steering shaft portion 3b.

Figure 2:
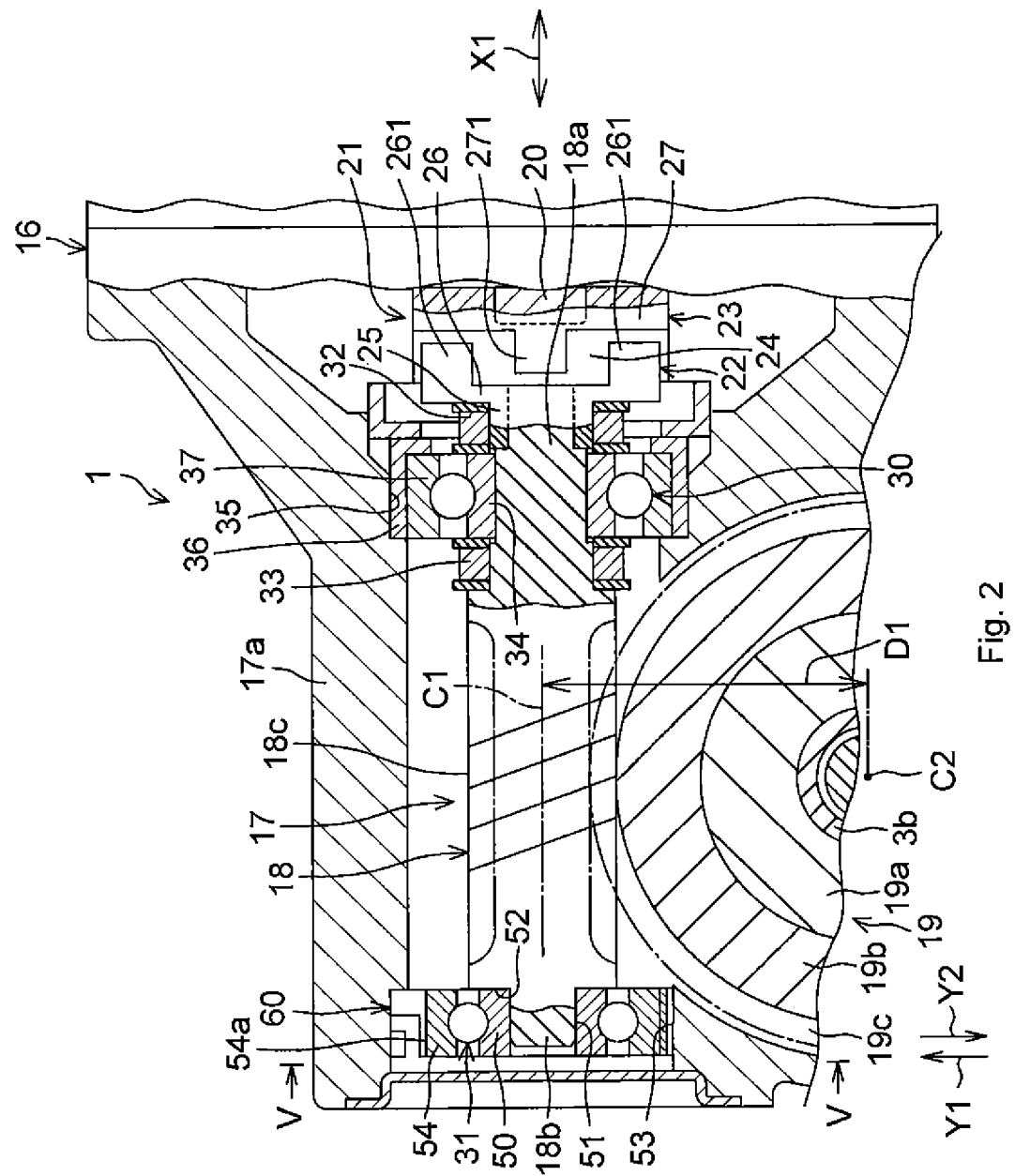
FIG. 2 is a sectional view of a main part of the electric power steering system.

As shown in FIG. 2, the worm shaft 18 is arranged coaxially with a rotary shaft 20 of the electric motor 16. The worm shaft 18 includes a first end portion 18a and a second end portion 18b, and a teeth portion 18c in an intermediate portion between the first end portion 18a and the second end portion 18b. The worm wheel 19 is connected to an axial intermediate portion of the second steering shaft portion 3b of the steering shaft 3 so that the worm wheel 19 is rotatable together with the axial intermediate portion of the second steering shaft portion 3b and is unable to move in an axial direction. The worm wheel 19 includes a circular cored bar 19a that is connected to the second steering shaft portion 3b so as to rotate together with the second steering shaft portion 3b, and a synthetic resin member 19b that surrounds a periphery of the cored bar 19a. A teeth portion 19c is formed on an outer periphery of the synthetic resin member 19b.

The first end portion 18a of the worm shaft 18 is connected with an end portion of the rotary shaft 20 (an output shaft) of the electric motor 16, which faces the first end portion 18a, through a joint 21 so that torque is transmittable between the first end portion 18a of the worm shaft 18 and the end portion of the rotary shaft 20, and the first end portion 18a of the worm shaft 18 and the end portion of the rotary shaft 20 are able to oscillate with respect to each other. More specifically, the joint 21 includes a first rotational element 22 that is connected to the first end portion 18a of the worm shaft 18 so that the first rotational element 22 is rotatable together with the first end portion 18a of the worm shaft 18 and is unable to move in the axial direction, a second rotational element 23 that is connected to the rotary shaft 20 of the electric motor 16 so that the second rotational element 23 is rotatable together with the rotary shaft 20 of the electric motor 16 and is unable to move in the axial direction, and an elastic member 24 that is provided between the first rotational element 22 and the second rotational element 23 and transmits torque between both of the rotational elements 22 and 23.

Figure 3:
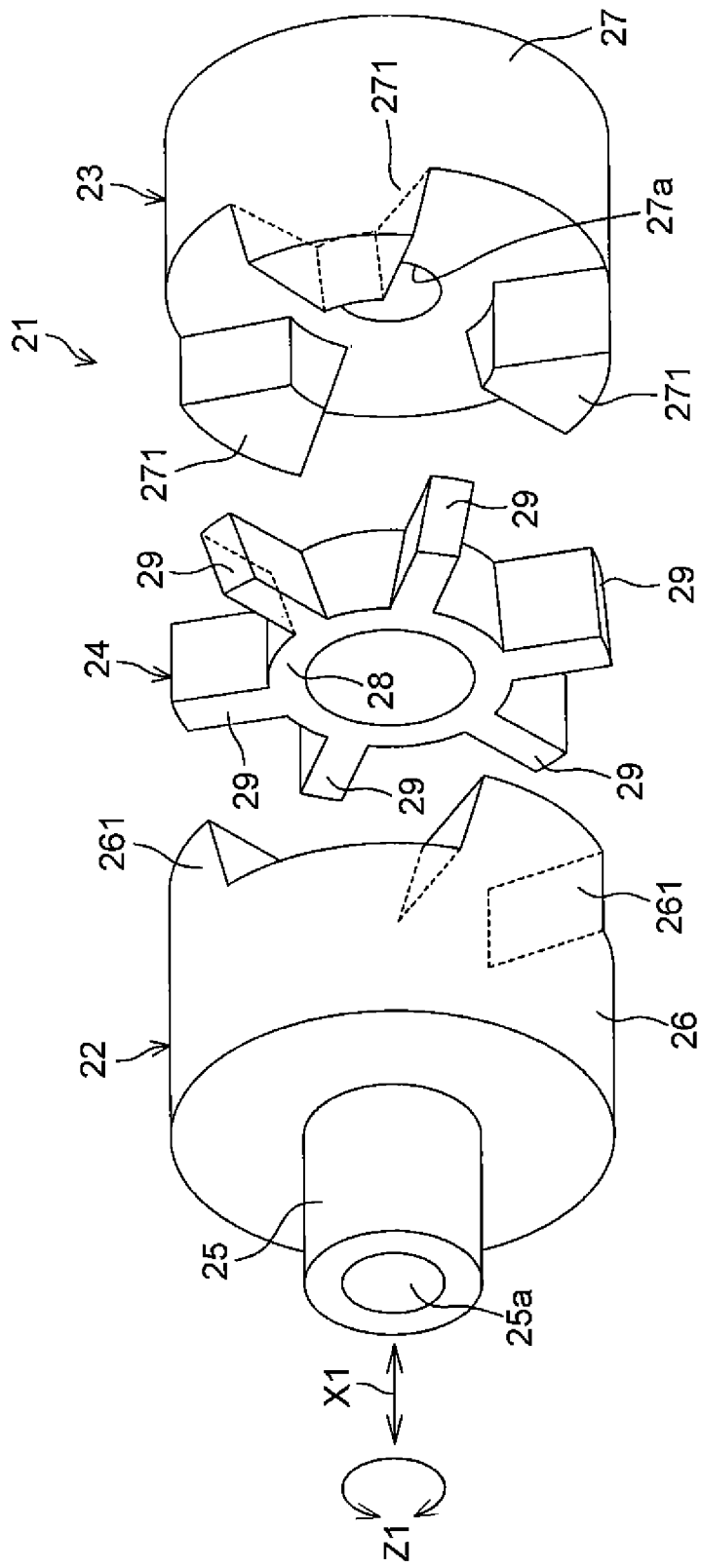
FIG. 3 is an exploded perspective view of a joint.

As shown in FIG. 3, the first rotational element 22 includes a boss 25 in which a fitting hole 25a is formed, and a circular flange 26 that extends radially outward from the boss 25. The first end portion 18a of the worm shaft 18 (see FIG. 2) is press-fitted into the fitting hole 25a. The boss 25 is fitted to the first end portion 18a of the worm shaft 18 so that the boss 25 is rotatable together with the first end portion 18a of the worm shaft 18 and is unable to move in the axial direction. The second rotational element 23 includes a body 27 in which a fitting hole 27a is formed, the body 27 facing the flange 26 of the first rotational element 22 in an axial direction X1. The rotary shaft 20 of the electric motor 16 (see FIG. 2) is press-fitted into the fitting hole 27a.

A plurality of engaging projections 261, which project toward the body 27 of the second rotational element 23, are provided in the flange 26 of the first rotational element 22 so that the engaging projections 261 are spaced from each other at equal intervals in a circumferential direction Z1. Also, a plurality of engaging projections 271, which project toward the flange 26 of the first rotational element 22, are provided in the body 27 of the second rotational element 23 so that the engaging projections 271 are spaced from each other at equal intervals in the circumferential direction Z1. The engaging projections 261 and the engaging projections 271 are arranged alternately in the circumferential direction Z1. The elastic member 24 includes a circular main body portion 28, and a plurality of engaging arms 29 that extend radially from the main body portion 28. The engaging arm 29 of the elastic member 24 is sandwiched between the corresponding engaging projections 261 and 271 of the rotational elements 22 and 23, the engaging projections 261 and 271 being adjacent to each other in the circumferential direction Z1.

With reference to FIG. 2, the first end portion 18a of the worm shaft 18 is supported by a housing 17a of the speed reducer 17 through a first bearing 30 so that the first end portion 18a of the worm shaft 18 is rotatable. The second end portion 18b of the worm shaft 18 is supported by the housing 17a of the speed reducer 17 through a second bearing 31 so that the second end portion 18b of the worm shaft 18 is rotatable. As the elastic member 24 of the joint 21 is elastically deformed, the worm shaft 18 is allowed to oscillate about the center of the first bearing 30, with respect to the rotary shaft 20.

A first elastic body 32 and a second elastic body 33, which urge the worm shaft 18 to a neutral position in the axial direction, are arranged in the first end portion 18a of the worm shaft 18. The first bearing 30 includes an inner ring 34 that is fitted to the first end portion 18a of the worm shaft 18 so that the inner ring 34 is rotatable together with the first end portion 18a of the worm shaft 18, and an outer ring 37 that is held in a bearing hole 35 through a bush 36, the bearing hole 35 being provided in the housing 17a of the speed reducer 17.

Figure 4:
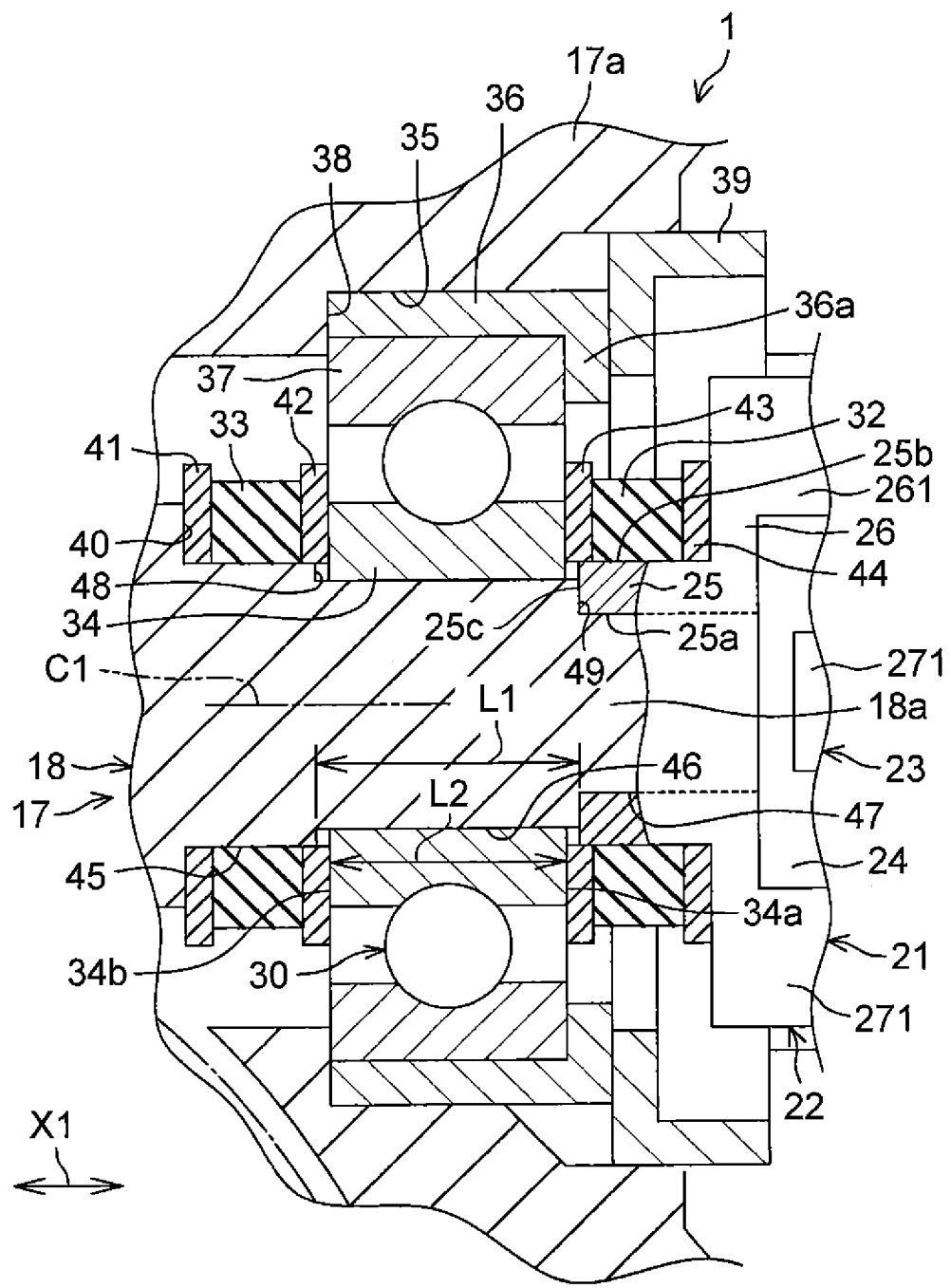
FIG. 4 is an enlarged sectional view of the main part of the electric power steering system.

FIG. 4 is an enlarged view of a part of FIG. 2. The outer ring 37 and a circular flange 36a in an end portion of the bush 36 are sandwiched in the axial direction between a positioning step portion 38 that is provided in an end portion of the bearing hole 35, and a fixing member 39 that is screwed and fitted into the bearing hole 35. Thus, an axial movement of the outer ring 37 is restricted. The inner ring 34 of the first bearing 30 is fitted to the outer periphery of the first end portion 18a of the worm shaft 18 so that the inner ring 34 is rotatable together with the first end portion 18a of the worm shaft 18. The first elastic body 32 and the second elastic body 33 are arranged on respective sides of the inner ring 34 in the axial direction X1, and thus the inner ring 34 is sandwiched between the first elastic body 32 and the second elastic body 33 in the axial direction X1. The first elastic body 32 and the second elastic body 33 elastically urge the worm shaft 18 to the neutral position in the axial direction X1. Each of the elastic bodies 32 and 33 is, for example, a bush that is formed of an elastic material such as rubber and thermoplastic elastomer.

The second elastic body 33 is provided between a circular receiving plate 41 that abuts on a positioning step portion 40 on an outer periphery of the worm shaft 18, and a circular receiving plate 42 that abuts on a second end face 34b of the inner ring 34, and the second elastic body 33 is compressed in the axial direction X1. The first elastic body 32 is provided between a circular receiving plate 43 that abuts on a first end face 34*a* of the inner ring 34, and a receiving plate 44 that abuts on the flange 26 of the first rotational element 22 of the joint 21, and the first elastic body 32 is compressed in the axial direction X1. Each of the receiving plates 41 to 44 is made of, for example, metal.

The outer periphery of the first end portion 18*a* includes a first portion 45, a second portion 46, and a third portion 47. The receiving plate 41, the second elastic body 33, and the receiving plate 42 are fitted to and held on the first portion 45. The second portion 46 has a smaller diameter than a diameter of the first portion 45, and serves as an inner ring fitting portion to which the inner ring 34 is fitted. The third portion 47 has a smaller diameter than the diameter of the second portion 46, and serves as a boss fitting portion to which the boss 25 of the first rotational element 22 is fitted to the third portion 47. The receiving plate 43, the first elastic body 32, and the receiving plate 44 are fitted to and held on an outer periphery 25*b* of the boss 25. A positioning step portion 48 is formed between the first portion 45 and the second portion 46 (the inner ring fitting portion). The positioning step portion 48 faces the second end face 34*b* of the inner ring 34.

A positioning step portion 49 is formed between the second portion 46 (the inner ring fitting portion) and the third portion (the boss fitting portion). An end face 25*c* of the boss 25 abuts on the positioning step portion 49, and thus, the boss 25 is positioned with respect to the worm shaft 18 in the axial direction X1. A distance L1 between the positioning step portion 48 and the end face 25*c* of the boss 25 is set so as to be longer than a distance L2 between both of the end faces 34*a* and 34*b* of the inner ring 34. A difference between the distances L1 and L2 (L1−L2) corresponds to a range of movement of the worm shaft 18 in the axial direction X1 (for example, 0.3 mm on each of the right and left sides from the neutral position, thus 0.6 mm in total).

As shown in FIG. 2 and FIG. 4, an inner ring 50 of the second bearing 31 is fitted to a fitting recessed portion 51 provided on the outer periphery of the second end portion 18*b* of the worm shaft 18 so that the inner ring 50 is rotatable together with the second end portion 18*b* of the worm shaft 18. One end face of the inner ring 50 abuts on a positioning step portion 52 provided on the outer periphery of the second end portion 18*b*. Thus, an axial movement of the inner ring 50 with respect to the worm shaft 18 is restricted. The housing 17*a* is provided with a bearing hole 53 for holding the second bearing 31. The bearing hole 53 is formed so as to hold the second bearing 31 such that the second bearing 31 is able to be biased in directions Y1 and Y2 in which a center-to-center distance D1 between the worm shaft 18 and the worm wheel 19 (corresponding to a distance between a center C1 of rotation of the worm shaft 18 and a center C2 of rotation of the worm wheel 19) is increased and decreased (a direction Y1 in which the center-to-center distance D1 is increased and a direction Y2 in which the center-to-center distance D1 is decreased).

Figure 5:
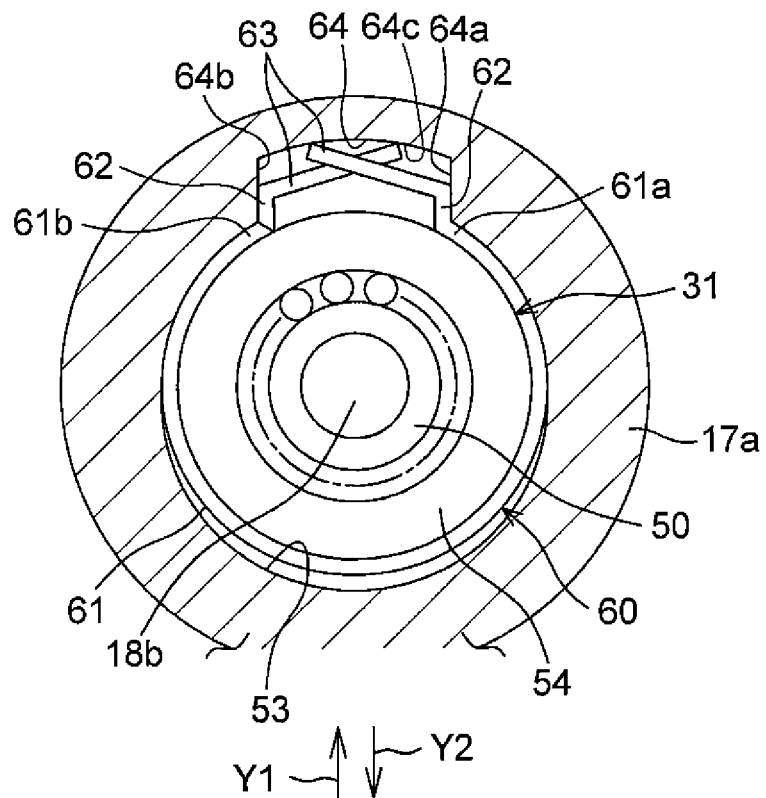
FIG. 5 is a sectional view taken along a line V-V in FIG. 2.
Figure 6:
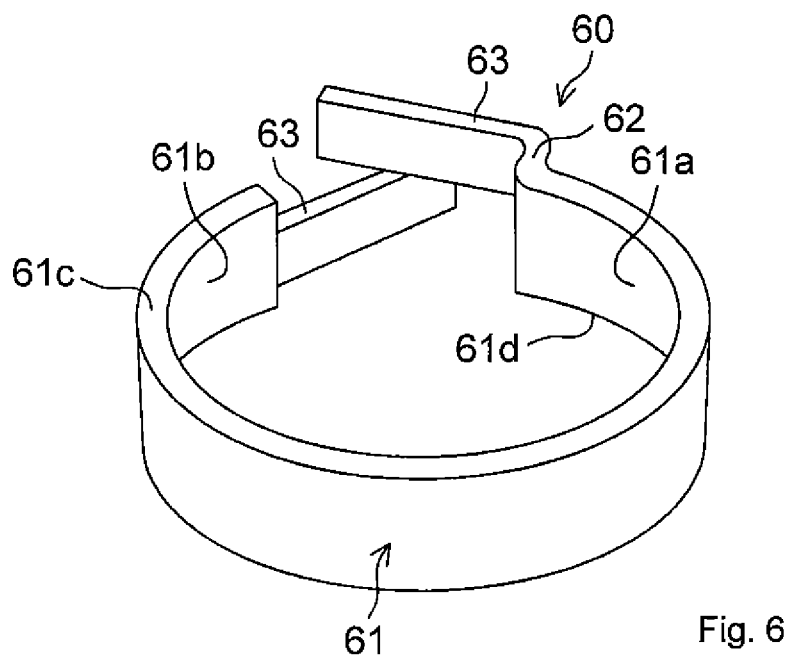
FIG. 6 is a perspective view of an urging member.

As an urging member, a circular plate spring 60, for example, is provided between an inner periphery of the bearing hole 53 and an outer ring 54 of the second bearing 31. The plate spring 60 urges the second bearing 31 in the direction Y2 in which the center-to-center distance D1 is decreased. The plate spring 60 as the urging member is, for example, a thin plate-shaped member that is formed of a metal plate. FIG. 5 is a sectional view taken along a line V-V in FIG. 2. FIG. 6 is a perspective view of the plate spring 60. The plate spring 60 includes a main body portion 61 having an ended circular shape that surrounds an outer periphery 54*a* of the outer ring 54 of the second bearing 31, paired rotation restricting portions 62 that are bent and extended respectively from a first end portion 61*a* and a second end portion 61*b* that are end portions of the main body portion 61 in the circumferential direction, and paired cantilever-shaped elastic tongue pieces 63 bent and extended from the rotation restricting portions 62, respectively.

A width of each of the rotation restricting portions 62 is smaller than a width of the main body portion 61. The main body portion 61 is held on the inner periphery of the bearing hole 53 of the housing 17*a* through frictional engagement. As shown in FIG. 6, one of the pair of elastic tongue pieces 63 is arranged on a side of a first edge 61*c*, and the other elastic tongue piece 63 is arranged on a side of a second edge 61*d*. The elastic tongue pieces 63 cross each other.

With reference to FIG. 5, in a part of the inner periphery of the bearing hole 53 of the housing 17*a*, a receiving recessed portion 64 is formed. The receiving recessed portion 64 is recessed in a direction (the direction Y1 in which the center-to-center distance D1 is increased) that is opposite to a direction toward the worm wheel 19 (the direction Y2 in which the center-to-center distance D1 is decreased) with respect to the second bearing 31. A distal end of each of the elastic tongue pieces 63 of the plate spring 60 is received by a bottom 64*c* of the receiving recessed portion 64 of the bearing hole 53, and an urging force of each of the elastic tongue pieces 63 urges the second end portion 18*b* of the worm shaft 18 through the second bearing 31 in the direction Y2 in which the center-to-center distance D1 is decreased. The receiving recessed portion 64 has paired inner walls 64*a* and 64*b* that face each other in the circumferential direction Z1 of the bearing hole 53. The rotation restricting portions 62 of the plate spring 60 abut on the corresponding inner walls 64*a* and 64*b*, respectively, thereby restricting rotation of the plate spring 60 in the circumferential direction Z1 of the bearing hole 53.

According to this embodiment, the elastic body (the first elastic body 32), which urges the worm shaft 18 in the axial direction X1 (toward the electric motor 16), is supported by the element (the first rotational element 22) of the joint 21 in the axial direction X1. Therefore, the structure is simplified compared to a case where a support member is provided in addition to the joint 21.

Since the elastic body (the first elastic body 32) has a circular shape that surrounds the boss 25, the elastic body (the first elastic body 32) and a part of the joint 21 are able to be arranged so as to overlap each other in the axial direction X1. As a result, it is possible to reduce an axial space.

The worm shaft 18 is press-fitted into the boss 25 to a position where the boss 25 and the positioning step portion 49 between the second portion 46 (the inner ring fitting portion) and the third portion 47 (the boss fitting portion) abut on each other. Thus, the boss 25 is accurately positioned in the axial direction X1 of the worm shaft 18. Hence, it is possible to set an axial load applied by the elastic body (the first elastic body 32) with high accuracy.

The worm shaft 18 is urged to the neutral position in the axial direction X1 by the first elastic body 32 and the second elastic body 33 that are arranged on respective sides of the first bearing 30. Therefore, the worm shaft 18 is slightly moved in the axial direction X1 during minute steering, and thus, steering feeling is improved.

There is provided the urging member (the plate spring 60) that urges the second end portion 18*b* of the worm shaft 18 toward the worm wheel 19. The joint 21, which connects the first end portion 18*a* of the worm shaft 18 with the rotary shaft 20 of the electric motor 16, includes the first rotational element 22 that is connected to the worm shaft 18 so as to rotate together with the worm shaft 18, the second rotational element 23 that is connected to the rotary shaft 20 so as to rotate together with the rotary shaft 20, and the elastic member 24 that connects both of the rotational elements 22 and 23 with each other so that torque is transmittable between the rotational elements 22 and 23. Therefore, as the rotational elements 22 and 23 are allowed to be inclined with respect to each other due to the elastic member 24 in the joint 21, the worm shaft 18 that is urged by the urging member 60 is oscillated smoothly, and thus, backlash between the worm shaft 18 and the worm wheel 19 is reliably maintained at zero.

The present invention is not limited to the foregoing embodiment, and for example, a compression coil spring may be used as the urging member instead of the plate spring 60. In the foregoing embodiment, steering assist force of the electric motor is applied to the steering shaft. However, the steering assist force of the electric motor may be applied to a pinion shaft instead.

What is claimed is:

1. An electric power steering system comprising:
   an electric motor having a rotary shaft;
   a speed reducer that includes a worm shaft having a first end portion and a second end portion, and a worm wheel that meshes with the worm shaft;
   a joint that includes a rotational element that has a boss into which the first end portion of the worm shaft is press-fitted and a flange extending radially from the boss, the joint connecting the first end portion of the worm shaft with the rotary shaft so that torque is transmittable between the first end portion of the worm shaft and the rotary shaft;
   a housing that houses the speed reducer;
   a bearing that is held by the housing and supports the first end portion of the worm shaft so that the first end portion of the worm shaft is rotatable and movable in an axial direction;
   an elastic body that is interposed between an inner ring of the bearing and the flange of the rotational element, and urges the worm shaft in the axial direction toward the electric motor through the rotational element; and
   a receiving plate that is disposed along the same axis as the flange and directly contacts the elastic body and directly contacts the flange,
   wherein the flange has an outer diameter that is larger than an outer diameter of the receiving plate such that the outermost surface of the flange extends a distance farther from the axis than the outermost surface of the receiving plate extends from the axis.

2. The electric power steering system according to claim 1, wherein the elastic body has a circular shape that surrounds an outer periphery of the boss.

3. The electric power steering system according to claim 1, wherein an outer periphery of the worm shaft includes an inner ring fitting portion to which the inner ring is fitted, a boss fitting portion to which the boss is fitted, the boss fitting portion having a smaller diameter than a diameter of the inner ring fitting portion, and a positioning step portion that is formed between the inner ring fitting portion and the boss fitting portion, and positions the boss in the axial direction.

4. The electric power steering system according to claim 1, comprising:
   a first elastic body that serves as the elastic body; and
   a second elastic body that is arranged on an opposite side of the bearing from the first elastic body, and urges the worm shaft in the axial direction toward the second end portion.

5. The electric power steering system according to claim 1, comprising an urging member that elastically urges a second end portion of the worm shaft toward the worm wheel, wherein
   the joint includes a first rotational element that serves as the rotational element, a second rotational element that is connected to an end portion of the rotary shaft so as to rotate together with the end portion of the rotary shaft, and an elastic member that connects the first rotational element with the second rotational element so that torque is transmittable between the first rotational element and the second rotational element.

6. An electric power steering system comprising:
   an electric motor having a rotary shaft;
   a speed reducer that includes a worm shaft having a first end portion and a second end portion, and a worm wheel that meshes with the worm shaft;
   a joint that includes a rotational element that has a boss into which the first end portion of the worm shaft is press-fitted and a flange extending radially from the boss, the joint connecting the first end portion of the worm shaft with the rotary shaft so that torque is transmittable between the first end portion of the worm shaft and the rotary shaft;
   a housing that houses the speed reducer;
   a bearing that is held by the housing and supports the first end portion of the worm shaft so that the first end portion of the worm shaft is rotatable and movable in an axial direction; and
   an elastic body that is interposed between an inner ring of the bearing and the flange of the rotational element and is disposed along the same axis as the flange, and urges the worm shaft in the axial direction toward the electric motor through the rotational element,
   wherein (i) the boss is positioned between the worm shaft and the elastic body in a radial direction, and (ii) the flange has a an outer diameter that is larger than an outer diameter of the elastic body such that the outermost surface of the flange extends a distance farther from the axis than the outermost surface of the elastic body extends from the axis.

* * * * *